A. KIMMERLING.
FISH GUARD.
APPLICATION FILED JULY 5, 1916.

1,215,817.

Patented Feb. 13, 1917.

WITNESSES
Howard Costello
H. H. Babcock

INVENTOR
Adam Kimmerling
BY Richard B. Owen
ATTORNEY

UNITED STATES PATENT OFFICE.

ADAM KIMMERLING, OF SCHLEISINGERVILLE, WISCONSIN.

FISH-GUARD.

1,215,817.      Specification of Letters Patent.      Patented Feb. 13, 1917.

Application filed July 5, 1916. Serial No. 107,631.

*To all whom it may concern:*

Be it known that I, ADAM KIMMERLING, a citizen of the United States, residing at Schleisingerville, in the county of Washington and State of Wisconsin, have invented certain new and useful Improvements in Fish-Guards, of which the following is a specification.

This invention relates to fish guards, and more particularly to a guard especially adapted to be placed in irrigation ditches at the inlet end of the ditch, to prevent fish from entering the ditch from the reservoir or stream from which the water is taken.

One of the main objects of the invention is to provide a device of the character stated of simple construction and operation, which will effectually prevent fish from escaping into the ditch, while, at the same time, not interfering with the flow of water.

Further objects will appear from the detail description.

Figure 1:
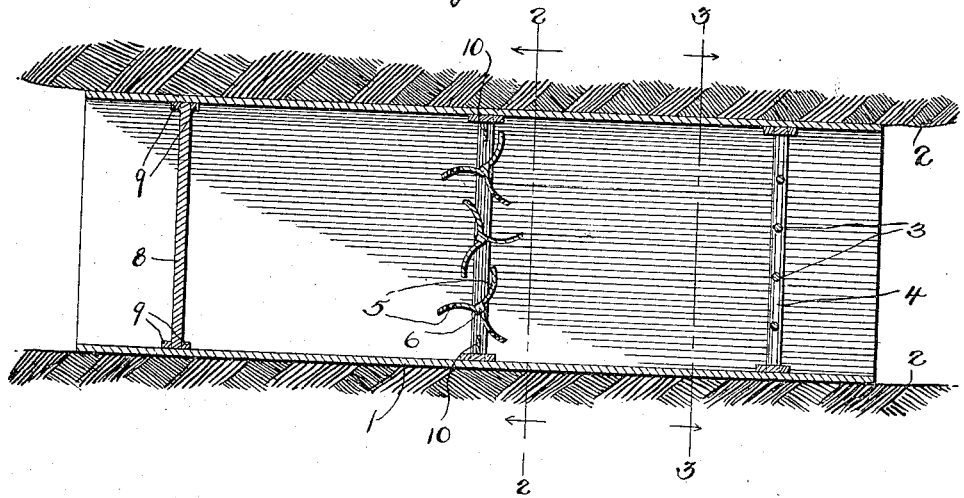
Figure 1 is a plan view of the invention with the top of the casing removed.
Figure 2:
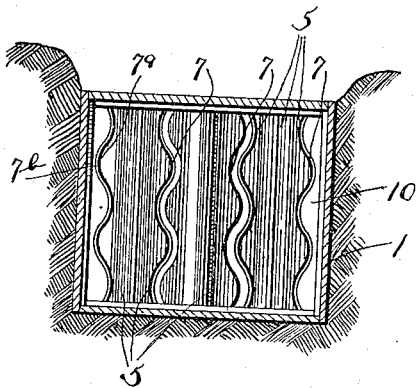
Fig. 2 is a section on the line 2—2 of Fig. 1.
Figure 3:
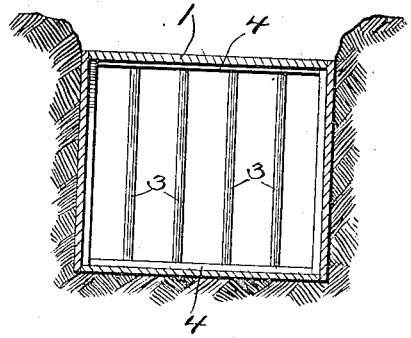
Fig. 3 is a section on line 3—3 of Fig. 1.

In carrying out my invention, I construct a suitably braced rectangular trough-like box or casing 1 of such size as to fit tightly between the walls 2 of the irrigation ditch, at the intake end thereof. Near the inlet end of this box I mount a series of vertical rods 3 supported in cross strips 4. These rods serve to prevent the entry of pieces of wood and other debris into the casing. At the longitudinal center of the casing I mount a plurality of rotatable guard members. Each of these members is composed of three arcuate blades 5 which are secured to a common central shaft 6. These guard members are so arranged that their blades intermesh so as to form a closure which effectually prevents the passage of fish from the inlet end of the casing. The vertical edges of the blades 5 are serrated or corrugated, as at 7, the blades being so relatively disposed that the corrugations 7ª of one blade fit snugly into the recesses 7ᵇ of the adjacent blade of the next rotating guard member. By this arrangement, as the water flows through the casing 1, the members 5 rotate, permitting passage of the water, but effectually preventing the escape of any fish into the irrigation ditch. The rods 3 will, as stated, prevent the entry of large pieces of debris into the casing. Any small pieces of wood or other matter, which passes between the bars 3, will be engaged by the revolving blades 5 which will act to break the wood into pieces of such small size as will pass between the blades during their rotation. The arcuate shape of the blades greatly facilitates this operation. Any fish which attempts to pass between the guard members will be struck by the blades so as to be driven back into the reservoir or stream from which the water is taken, thus effectually preventing their passage into the irrigation ditch.

A gate 8 is slidably mounted between guide strips 9 secured to the sides of the casing 1. A suitable slot is provided through the top of the casing to permit operation of this gate so as to control the flow of the water through the casing.

At each side of the casing 1, adjacent the two outer guard members, I mount vertical strips 10, the inner edges of which are also corrugated to mesh with the blades of the two guard members when the same are rotated.

There may be slight variations made in the arrangement and construction of the various parts of my invention, and I intend to include all such variations in this application in which a preferred form only of my invention is disclosed.

What I claim is:

1. In a device of the character described, a trough-like casing open at both ends and adapted to be mounted in an irrigation ditch, and a plurality of guard members rotatably mounted therein and extending transversely of the casing, said members being so relatively disposed as to intermesh when rotating.

2. In a device of the character described, a trough-like casing open at both ends and adapted to be mounted in an irrigation ditch, and a plurality of guard members rotatably mounted therein and extending transversely of the casing, each of said members being provided with a plurality of radially extending blades, and the said members being so positioned relatively that their blades intermesh when said members are rotating.

3. In a device of the character described, a trough-like casing open at both ends and adapted to be mounted in an irrigation ditch, a plurality of guard members rotatably mounted therein and extending transversely of the casing, each of said members having a plurality of radially disposed arcuate blades, the said members being so relatively disposed that their blades intermesh when the members are rotating.

4. In a device of the character described, the combination of a casing, a plurality of guard members rotatably mounted therein, each of said members having a plurality of arcuate radially disposed blades, the vertical edges of said blades being corrugated, and the said members being so relatively disposed that the corrugated edges of their blades intermesh when they are rotating.

5. In a device of the character described, the combination of a casing, vertical strips secured to the sides of said casing and having their inner edges corrugated, and a plurality of guard members rotatably mounted intermediate the said strips, each of the said guard members having a plurality of radially disposed arcuate blades, and the vertical edges of said blades being corrugated, the said guard members and strips being so relatively disposed that their corrugated edges intermesh when the guard members are rotating.

In testimony whereof I affix my signature in presence of two witnesses.

ADAM KIMMERLING.

Witnesses:
JOHN N. GINDICE,
CHAS. J. ROTH.

Copies of this patent may be obtained for five cents each, by addressing the "Commissioner of Patents, Washington, D. C."